Nov. 26, 1957   N. R. L. QUINN ET AL   2,814,512
SEALING DEVICES
Filed May 25, 1953   2 Sheets-Sheet 1
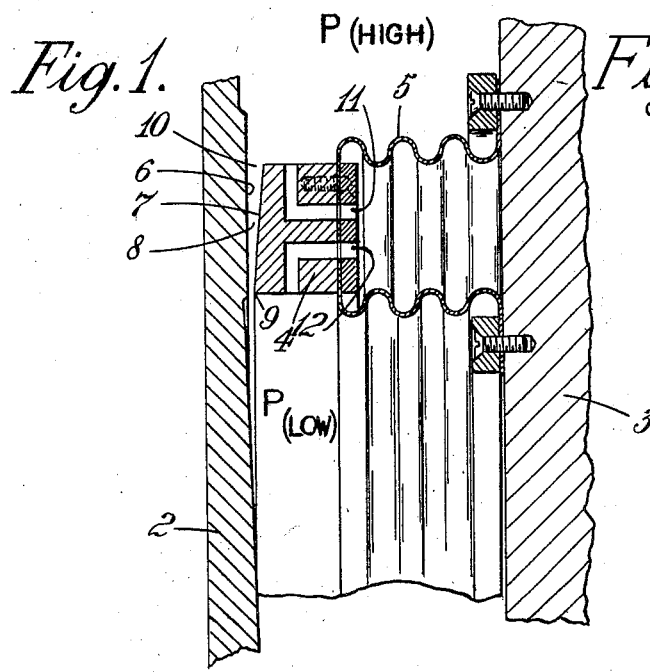
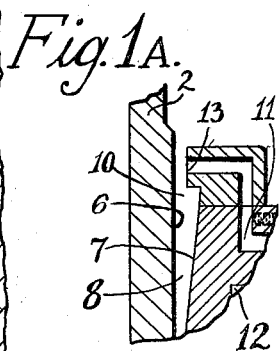
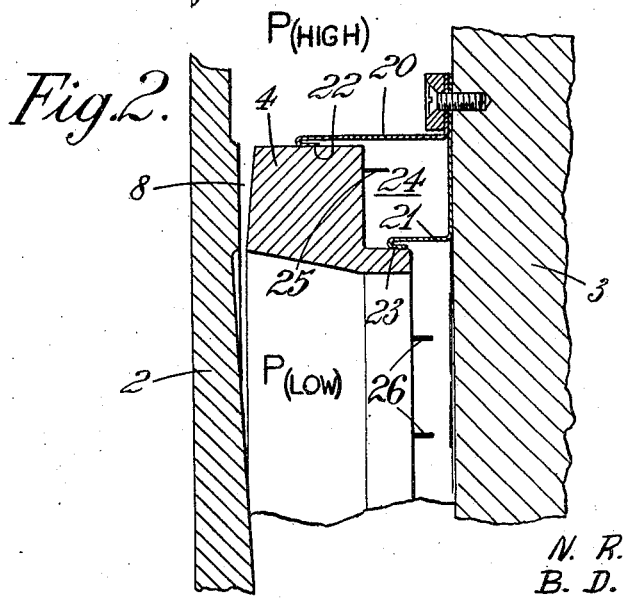
INVENTORS
N. R. L. QUINN &
B. D. BLACKWELL &
A. SCOTT
BY Wilkinson & Mawhinney
ATTYS.

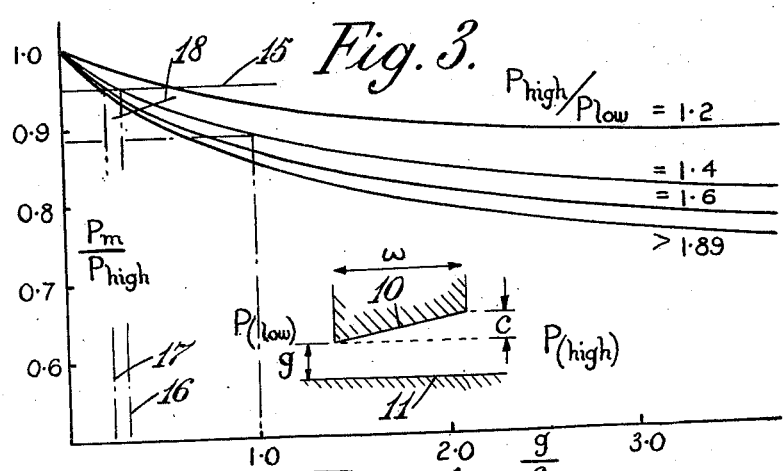
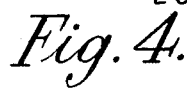
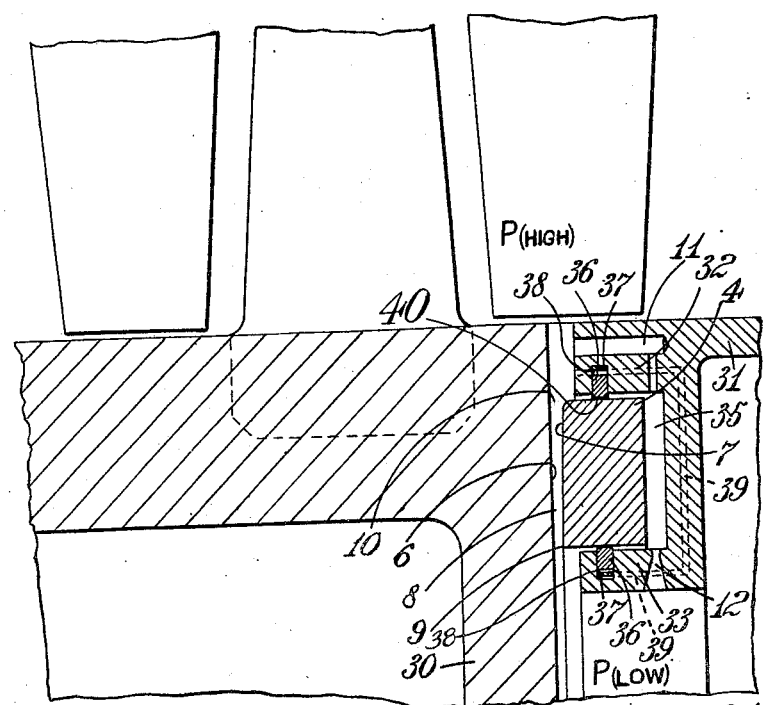

United States Patent Office 2,814,512
Patented Nov. 26, 1957

2,814,512

SEALING DEVICES

Neville Raymond Lloyd Quinn, Basil Davenport Blackwell, and Alexander Scott, Bristol, England, assignors to The Bristol Aeroplane Company Limited, Bristol, England, a British company Application May 25, 1953, Serial No. 357,274

Claims priority, application Great Britain June 3, 1952

14 Claims. (Cl. 286—9)

This invention relates to sealing devices for use in power conversion machines arranged to operate with a compressible fluid working medium. In compressors, turbines and many other machines it is frequently necessary to restrict the leakage of a fluid through a peripheral gap between two members arranged for rotation or sideways movement relatively to one another while being subject to unavoidable movement towards and away from one another, due for example to differential thermal expansion. In the case of small parts moving at speeds which are not too high it is usually possible at the expense of some frictional losses to eliminate the gap by means of sealing devices carried by one of the members and rubbing upon the other, but where it is required to provide a seal at a large diameter between such rapidly rotating members as turbine and compressor rotors rubbing contact is not permissible.

To prevent the closing of a peripheral gap between two members urged towards one another it is known to provide the members with parallel opposed faces and to inject a fluid through openings in one of the faces of a sufficiently high pressure to act in the manner of an air bearing so that rubbing contact is prevented.

Such an arrangement entails the provision of means for generating a separate supply of high pressure fluid and its action is not sufficiently certain and predictable in view of the number of variables involved. The object of the present invention is to provide an improved arrangement in which a controlling force which rises as the gap diminishes and opposes closing of the gap is produced directly by the pressure against leakage of which sealing is required.

The arrangement according to the present invention for maintaining between zero and a maximum dimension a peripheral gap between two members movable towards and away from one another, said gap separating during normal operation a zone containing a compressible fluid at a pressure $P_{(high)}$ from a zone wherein there is existent a lower pressure $P_{(low)}$, comprises (a) the provision on the members of a pair of opposed peripheral faces which have an overlapping area defined between a peripheral line at which the gap between the members is narrowest and a peripheral line nearer the high pressure zone at which fluid passing into the space between the said faces commences to fall in pressure, and (b) the provision of means for urging said members together with a force F which is the resultant of all forces between the members other than that due to the said fluid acting on said overlapping area, is less than $P_{(high)}$ times the projection of the said overlapping area in a plane normal to the force F, and is not less than the force which said fluid at the minimum required working pressure ratio $P_{(high)}/P_{(low)}$ is capable of exerting on said projected area at the maximum limit of the gap dimension.

The expression "peripheral faces" is here intended to include both circular (annular) and non-circular faces, the width transversely to the gap being preferably, but not necessarily uniform, and the faces not necessarily being disposed around the outer margins or "peripheries" of the members on which they are formed. It is furthermore fundamental that the surfaces lie in or have a substantial component in a plane transverse to the direction in which the two members are urged together, that is to say they approach one another bodily and not eccentrically as one cylindrical surface displaced within another would do.

The arrangement operates upon the principle that so long as the gap remains open a fall of pressure occurs as between the edges of the faces on the high and low pressure sides of the gap so that the faces are repelled by a force which is the summation of the elementary pressures in the gap acting upon the elementary surface areas, this force increasing as the gap closes, and tending towards a value equal to the high pressure $P_{(high)}$ acting over the whole overlapping projected area, hereinafter denoted A when the edges of said faces on the low pressure side come into contact and the gap is completely closed. It will be clear therefore that the more nearly the force F urging the faces together approaches the maximum repelling force $A \times P_{(high)}$ the smaller will the gap at which the arrangement will become stabilised.

It will furthermore be clear that where the force F or the high pressure is variable the other of these quantities must vary in accordance therewith to maintain the desired relationship. Such variation may occur naturally if the force F is produced by the high pressure, and according to a feature of the present invention means may be provided to control the magnitude of the force F as a function of $P_{(high)}$.

When this feature is adopted, means may also be provided to control the magnitude of the force F as a function of the width of the gap between said faces, such that the magnitude of the force F decreases as the width of the gap decreases. In this way the size of the gap can be held within closer limits since the control forces increase more steeply with displacement from the stabilised position. The mean dimension of the gap can therefore be correspondingly reduced.

Preferably the force F is produced by fluid under pressure acting on an area substantially equal to the area A. By tapping fluid for this purpose from the high pressure zone through pressure reducing means it is assured that the gap cannot close.

Such pressure reducing means may comprise a bleed from the high pressure zone, and a discharge bleed to the low pressure zone, said discharge bleed being so dimensioned that it becomes choked during normal operation so that the force F is independent of the pressure of the fluid in the low pressure zone.

Preferably the fluid under pressure urging said members together is bled from the high pressure zone through a port which decreases in size as the gap between said faces decreases, the flow of fluid through said port being thereby decreased as the gap is decreased.

In practice, the arrangement is used as a leakage restricting device and to this end, according to another feature of the present invention one of said members (the second member) is carried by a third member, by support means constituting an adequate peripheral seal between them while allowing said second member sufficient freedom to move towards and away from the other of said members (the first member), said force F being developed between said third member and said second member, the third member and the first member being capable of relative rotation or relative sideways movement while being subject to unavoidable movements towards and away from each other, the arrangement restricting the leakage of fluid between said first and third members.

Four embodiments of the present invention will now be described by way of example, three with reference to Figures 1, 1A, and 2 of the drawing, and one with reference to Figure 4, which shows an arrangement for restricting the leakage through a peripheral gap between an axial flow compressor rotor and a stationary member.

The other figure of the accompanying drawing, denoted Figure 3, is an explanatory diagram which will first be described.

In the small diagram forming part of Figure 3 two opposed faces 10 and 11 have an overlapping width $w$ and hence an overlapping area $w.x$, where $x$ is the extent of the surfaces in a direction perpendicular to the surface of the paper. The minimum gap between them is denoted by $g$ and the "convergence" by $c$. If a high pressure zone $P_{(high)}$ is established at the wider end of the gap and a lower pressure zone $P_{(low)}$ at the narrower end of the gap, there will be a leakage flow through the gap causing a fall of pressure along the gap from the starting value $P_{(high)}$. The overlapping faces will thus be subjected to a total repulsion force which is the summation of the elementary pressures in the gap acting upon the elementary surface areas and may be represented by a mean pressure $P_m$ times the overlapping area. In the curves of Figure 3 values of the ratio $P_m/P_{(high)}$ are shown as ordinates and of the ratio $g/c$ as abscissa and each curve is plotted for a different value of the overall pressure ratio $P_{(high)}/P_{(low)}$. From these curves it will be seen, for example, that when $g$ and $c$ are equal and the overall pressure ratio is 1·4 the mean pressure on the overlapping faces is about 0·89 of $P_{(high)}$ and that this value decreases with increasing overall pressure ratio until the latter reaches a value of 1·89. At this pressure ratio the gap becomes "choked" and further increases produce no change in $P_m$.

Supposing now that it is desired to maintain $g$ between zero and a maximum dimension equal to $c$, i. e. at which $$\frac{g}{c} = 1$$

from a minimum overall pressure ratio of 1·4 upwards, it will be sufficient to oppose the repulsion of the overlapping faces by a force F which is less than $P_{(high)}$ times the overlapping area (such a force would clearly just close the gap) and is not less than 0·89 times the product of $P_{(high)}$ and the overlapping area, since a force less than this would permit the faces to separate at the lowest overall pressure ratio of 1·4 to a spacing at which $g$ is greater than $c$. Preferably, as hereinafter described, the force F is produced by a counter pressure acting on an area of one of the members equal to the overlapping area and maintained at a substantially constant intermediate proportion of $P_{(high)}$ such as is indicated by the line 15. In such a case the variation in the ratio $$\frac{g}{c}$$

from a pressure ratio of 1·4 upwards would be from about 0·3 to 0·25 as indicated by the lines 16 and 17. Examples of arrangements for obtaining such a result will now be described.

In Figure 1 of the drawing, which figure shows an arrangement in accordance with the present invention for restricting the leakage through a peripheral gap between a turbine rotor and a stationary casing, part of the turbine rotor disc is shown in section at 2 and part of the stationary casing at 3. A member 4 in the form of a ring is carried by the casing 3 by means of an axially extendable annular bellows 5. The disc 2 and the ring 4 have opposed peripheral faces 6 and 7 forming between them a gap 8. On the side $P_{(high)}$ the fluid pressure is higher than on the side $P_{(low)}$ so that fluid flows through the gap from $P_{(high)}$ to $P_{(low)}$. The faces 6 and 7 are made convergent in the direction of such flow so that the gap 8 is narrowest between the edges 9 of the faces 6 and 7 on the low pressure side of the gap. The angle of divergence is chosen so that during normal operation, i. e. over a useful working range of the gap dimension, a fall of pressure occurs as the fluid enters the gap at 10, around the edges of the faces 6 and 7 on the high pressure side. Fluid is admitted to the bellows 5 through a passage 11 from the high pressure side and discharged to the low pressure side through a passage 12. Owing to pressure drop in the passage 11 the pressure in the bellows 5 cannot reach the high pressure $P_{(high)}$, whereas, should the gap close at edges 9, the whole of the face 7 will be subject to the pressure $P_{(high)}$. It will be evident therefore that the gap cannot close and that its dimension may be varied by controlling the pressure in the bellows 5. This may be effected by suitable choice of the dimensions of the passages 11 and 12. If desired, adjustable throttling means may be provided in one or both these passages.

It is well known in the art that if the pressure ratio across a bleed, such as the passage 12, exceeds a certain value the discharge through the bleed becomes substantially constant, this condition being known as "choked." The pressure drop across an upstream restriction, such as the passage 11, then becomes independent of the pressure below the downstream restriction, i. e. $P_{(low)}$. It is preferred to arrange the system of passages 11 and 12 to operate under conditions such as these, since the action is then more easily calculable, and corresponds to the operation described with reference to the line 15 of Figure 3, but this is not to say that the arrangement will not work satisfactorily when the overall pressure ratio $P_{(high)}/P_{(low)}$ is insufficient to permit "choked" operation of the discharge bleed formed by the passage 12.

The arrangement also ensures substantial uniformity of the width of the gap around the periphery since, should the gap tend to close unevenly, due for example to variations in the resilience of the bellows 5, the repelling pressure increases in the parts where the gap is smallest and the tendency is thereby corrected.

In a modification of the arrangement just described, the passage 11, as shown in Figure 1A, is extended to an entry opening 13 directed towards the face 6 and spaced from it by a gap the width of which is not less than that between the edges 9 on the low pressure side of the gap. The entry port formed around the periphery of the opening 13 therefore decreases in size as the gap 8 diminishes and, if it accounts for a substantial part of the pressure drop in the passage 11, produces fall in pressure in the bellows 5 as the gap 8 closes. In this way an increase in the repelling force acting on the face 7 is accompanied by a reduction in the force F so that any displacements of the ring 4 from the stable position are opposed by greater restoring forces than would otherwise be the case, and variation in the width of the gap due to parasitic uncontrollable effects, such as friction and the stiffness of the bellows, are minimised. Such operation may be represented by a sloping counter pressure line such as 18 on Figure 3.

While the opposed faces 6 and 7 have been shown converging with a straight taper, this is not essential. One or both faces 6 and 7 could be somewhat concave or convex, provided that the gap remains always narrowest between the edges of the faces on the low pressure side of the gap and that, in normal operation, a fall of pressure occurs between the high and low pressure edges of the faces. If the faces diverge again after converging forces will be produced tending to draw the faces together, and such forces would have to be taken into account in determining the resultant closing force F. In an assemblage in which the working movement involves displacement of the faces 6 and 7 at right angles to the direction in which they are thrust together, it is of course necessary that one of the faces should be flat and of sufficient extent to allow for the sideways movement required, but in a rotating assembly the faces should be more or less conical or curved as surfaces of revolution.

In another arrangement, shown in Figure 2, the bellows 5 is replaced by concentric cylindrical rings 20 and 21 of thin material, and the ring 4 is stepped, and is spigoted in said rings so that it encloses with the rings 20 and 21 an annular space 24. The rings 20, 21 are made of a material which is either sufficiently flexible to be pressed into sliding engagement with the ring 4 at 22 and 23 by the pressure differentials or which is slit axially at intervals as at 25 and 26 to provide such flexibility. Such axial slits 25, 26 may constitute the inlet and outlet bleeds for the annular space 24 behind the ring 4, and if necessary may be blanked off to a desired extent by overlying resilient fingers (not shown). Such an arrangement has the advantage that the parasitic forces, in this case due to friction at 22 and 23, are proportional to P(high) and therefore to the control forces available to overcome them.

In yet another arrangement, which is the preferred arrangement, the bellows 5 is replaced by an annular cylinder in which the ring 4 constituting an annular piston is slidably supported. This arrangement will now be described as applied to the restriction of leakage through a peripheral gap between a compressor rotor and a stationary housing. Referring to Figure 4, a part of the compressor rotor is shown in section at 30, and part of the housing in section at 31. The housing 31 is formed with a pair of rigid concentric rings 32, 33 defining therewith an annular cylinder 35 in which the ring 4 is slidably supported. The ring 4 is supported for sliding movement by two weak-sectioned piston rings 36, mounted in grooves 38 in the walls of the annular cylinder 35. Each ring 36 is located by a crimped spring 37 in the groove behind the ring, and ducts 39 are provided to lead fluid under pressure from the side P(high) into the grooves 38 behind the rings 36 so that during operation the rings 36 are pressed against the ring 4 by fluid pressure.

The compressor rotor 30 and the ring 4 have opposed peripheral faces 6 and 7 forming between them a gap 8. As previously described the faces 6 and 7 converge, the gap being narrowest between the edges 9 of the face 7, and the face 6, that is, on the low pressure side of the gap. Also, as before the angle of divergence is chosen so that during normal operation a fall of pressure occurs as the fluid enters the gap at 10.

Fluid is admitted to the cylinder space through a passage 11 from the high pressure side P(high), and is discharged to the low pressure side P(low), through the passage 12 which is in the form of a convergent/divergent nozzle.

By making the passage 12 in a venturi form, the passage can be made to remain choked down to lower values of $P_{(high)}/P_{(low)}$ than would otherwise be the case so that the force F remains a constant fraction of P(high) over an operating range extending down to quite slow running speeds of the compressor rotor. Additionally, by making the passage 12 of venturi form, it may be ensured that the ring 4 retires from the compressor rotor when the compressor is shut down.

This is because, during the fall of the pressure ratio $P_{(high)}/P_{(low)}$, the flow through the gap changes from the choked condition represented by the curve $$P_{(high)}/P_{(low)} > 1 \cdot 89$$

in Figure 3 substantially before the flow through the venturi 12 changes from the choked to the unchoked condition, so that, while the force F due to the pressure on the back of the ring 4 remains a constant proportion of P(high) as indicated by the line 15, the mean pressure on the face 7 would, if the ratio $$\frac{g}{c}$$

and therefore the gap remained the same, rise as indicated by the successive curves for pressure ratios of 1·6, 1·4 etc. In fact, therefore, the gap increases to maintain the mean pressure on the face 7 in conformity with the pressure on the back of the ring 4. Retraction of the ring is finally stopped at a desired maximum value of the gap by engagement with the base of the annular cylinder 35 or another suitably positioned abutment.

The inner peripheral surfaces of the piston rings 36 are radiused as at 40 to allow the ring 4 freedom of movement to incline its axis relatively to the axis of said rigid concentric rings 32, 33 and thereby follow any swash movements of the rotor 30. The ring 4 follows any swash movements of the rotor since the pressure forces on the face 7 are always greatest at the circumferentially extending part of the gap which has the smallest width, the out-of-balance pressure forces moving the ring to incline its axis so that it follows the swash of the rotor and keeps the mean width of the gap substantially constant all round the periphery. The angle of convergence of the gap should be sufficient to ensure that such swash displacements as may occur temporarily between the rotor 30 and the ring 4 cannot make the faces 6 and 7 parallel to one another, or actually reverse the direction of convergence, since in that case the self correcting action would be lost.

It is to be noted that in the arrangement just described since the piston rings 36 are pressed into engagement with the ring 4 under the action of fluid under a pressure which is a function of P(high), the frictional forces opposing movement of the ring 4 relatively to the rings 32, 33 is always proportional to the forces bringing about such movement regardless of the barometric pressure.

The edge of the face 7 on the ring 4 on the high pressure side of the gap 8 is preferably slightly rounded to provide a smooth entry of fluid into the gap.

What we claim is:

1. In a machine for handling compressible fluid and having two members arranged for movement relatively to one another, one of said members having a surface, said members being separated by a variable width gap which communicates a high pressure zone with a low pressure zone a sealing device for restricting the leakage of fluid through said gap, said sealing device comprising a projectible member, means on the other of said machine members carrying said projectible member, said projectible member being projectible across said gap towards a limiting position in which it approaches line contact with the surface on the said one member of said machine members, said projectible member being movable towards and away from said surface and providing with said surface a constriction in said gap which is at all times narrowest towards the low pressure side of said gap and widest towards the high pressure side of said gap, projecting means for said projectible member for urging said projectible member towards said surface, said projecting means including a chamber defined at least in part between said projectible member and said other of said machine members, first passage means independent of said constriction, said first passage means communicating said chamber with said high pressure zone, and second passage means independent of said constriction, said second passage means communicating said chamber with said low pressure zone so that the pressure in said chamber is always lower than the pressure in said high pressure zone during normal operation of the machine, the pressure in said chamber acting on an area of the projectible member thereby increasing the volume of said chamber and moving said projectible member to a position wherein the pressure in the constriction increases to a point at which a balance is effected between the effective pressures on each side of the projectible member.

2. A sealing device as claimed in claim 1 wherein said first passage means communicates with said gap on the high pressure side of said constriction.

3. A sealing device as claimed in claim 1 wherein said second passage means is of venturi formation having a cross-sectional area sufficiently small to obtain supercritical flow conditions through the second passage for the pressure ratio which exists across the ends of the second passage during normal operation of the machine so that it becomes choked during normal operation of the machine whereby the pressure in said chamber is independent of the pressure of the fluid in the low pressure zone.

4. A sealing device as claimed in claim 1 wherein said carrying means comprises an annular extendible bellows carried by said other machine member, the interior of said bellows being in communication with the high pressure zone and the low pressure zone through said first and second passage means so that, during normal operation of the machine the pressure of fluid in said bellows acts to extend said bellows, thereby to urge said projectible member towards said surface on said one machine member.

5. A sealing device as claimed in claim 1, wherein said first passage means communicates said chamber with the high pressure zone through an entry port which decreases in size as the width of said gap decreases, the flow of fluid through said entry port being thereby decreased as the width of the gap is decreased.

6. A sealing device as claimed in claim 5 wherein said first passage means is formed in said projectible member and has an entry opening to said high pressure zone directed towards said surface on said one machine member, and spaced apart therefrom by a distance not less than the narrowest part of said constriction, said entry opening and said surface together defining said entry port.

7. A sealing device as claimed in claim 1 wherein said gap is an annular gap the width dimension of which extends axially of the machine, said carrying means comprises a pair of concentric flexible rings, and said projectible member is slidably spigoted in said rings so that it encloses with said rings and said other member an annular space which constitutes said chamber, the pressure of fluid in said annular space acting on said projectible member to urge it towards said surface on said one machine member, and the rings being urged to engage said projectible member by the pressure differentials.

8. A sealing device as claimed in claim 7 wherein said first and second passage means each comprise axial slits in said rings, which slits provide the flexibility of the rings.

9. A sealing device as claimed in claim 1 wherein said gap is an annular gap the width dimension of which extends axially of the machine, said carrying means comprising a pair of rigid concentric rings on said other machine member and defining therewith an annular cylinder having grooved walls, piston rings housed in said grooves, said projectible member being slidably supported in said cylinder on said piston rings, said projectible member defining with said annular cylinder an annular space which constitutes said chamber, the pressure of fluid in said annular space acting on said projectible member to urge it towards said surface on said one machine member.

10. A sealing device as claimed in claim 9, wherein said second passage means is of a venturi form the cross-sectional areas of the entry, the throat and the exit of the venturi passage being relatively dimensioned so that the venturi passage will be choked during operation down to low values of the ratio of the high pressure to the low pressure.

11. A sealing device as claimed in claim 9 wherein a crimped spring is located in each groove between the bottom of its groove and its piston ring to resiliently urge the piston ring against the projectible member.

12. A sealing device as claimed in claim 11 wherein duct means is provided to lead fluid under pressure from the said high pressure zone to said piston ring grooves so that the rings are pressure urged towards said projectible member.

13. A sealing device as claimed in claim 12 wherein the peripheral surfaces of said piston rings bearing on said projectible member are rounded.

14. A rotary machine for handling compressible fluid and comprising a sealing device acting between relatively rotating members to separate a high pressure zone from a low pressure zone, in which said sealing device comprises an annular cylinder concentric with the axis of relative rotation of said members and carried by one of them, an annular piston of trapezoidal cross-sectional shape in said cylinder, said piston and the other member of said members having opposed surfaces, said piston being slidable so as to move its surface towards said surface of the other member, said opposed surfaces defining between them a space which is convergent in radial directions from the high to the low pressure zone, said piston having a surface provided with an effective piston area, said cylinder having an internal chamber one wall of which is defined by the piston surface having the effective piston area, an abutment limiting movement of the piston away from said other member, and passage means connecting the internal chamber of said annular cylinder with said high and low pressure zones so that an intermediate pressure is developed therein during normal operation of the machine, which intermediate pressure is sufficient to move the piston from the abutment towards the other member.

References Cited in the file of this patent
UNITED STATES PATENTS

| | | |
|---|---|---|
| 1,315,822 | Doran | Sept. 9, 1919 |
| 1,936,771 | Schellens | Nov. 28, 1933 |
| 2,036,308 | Vroom | Apr. 7, 1936 |
| 2,598,176 | Johnstone | May 27, 1952 |
| 2,673,752 | Swearingen | Mar. 30, 1954 |